United States Patent [19]

Huesman

[11] Patent Number: 4,639,160
[45] Date of Patent: Jan. 27, 1987

[54] WINDSHIELD WIPER BALL JOINT

[75] Inventor: Edward H. Huesman, West Carrollton, Ohio

[73] Assignee: General Motors Corporation, Detroit, Mich.

[21] Appl. No.: 819,929

[22] Filed: Jan. 21, 1986

[51] Int. Cl.⁴ ............................ F16B 9/00; F16C 11/00
[52] U.S. Cl. .......................................... 403/71; 403/76; 403/136
[58] Field of Search .................... 403/71, 90, 136, 141, 403/76, 144, 124, 140, 143

[56] References Cited

U.S. PATENT DOCUMENTS 2,767,004 10/1956 Ashworth .............................. 403/36
3,299,721  1/1967 Ziegler ............................ 403/143 X
3,483,888 12/1969 Wurzel ............................ 403/123 X
4,101,228  7/1979 Scheerer ......................... 403/143 X

FOREIGN PATENT DOCUMENTS 1351949 12/1963 France ................................. 403/141

Primary Examiner—Andrew V. Kundrat
Attorney, Agent, or Firm—Dean L. Ellis

[57] ABSTRACT

A ball joint for windshield wiper linkage includes a ball stud attached to one linkage member and a stamped metal socket member enclosing the ball stud and resiliently urged within an aperture of another linkage member.

2 Claims, 4 Drawing Figures

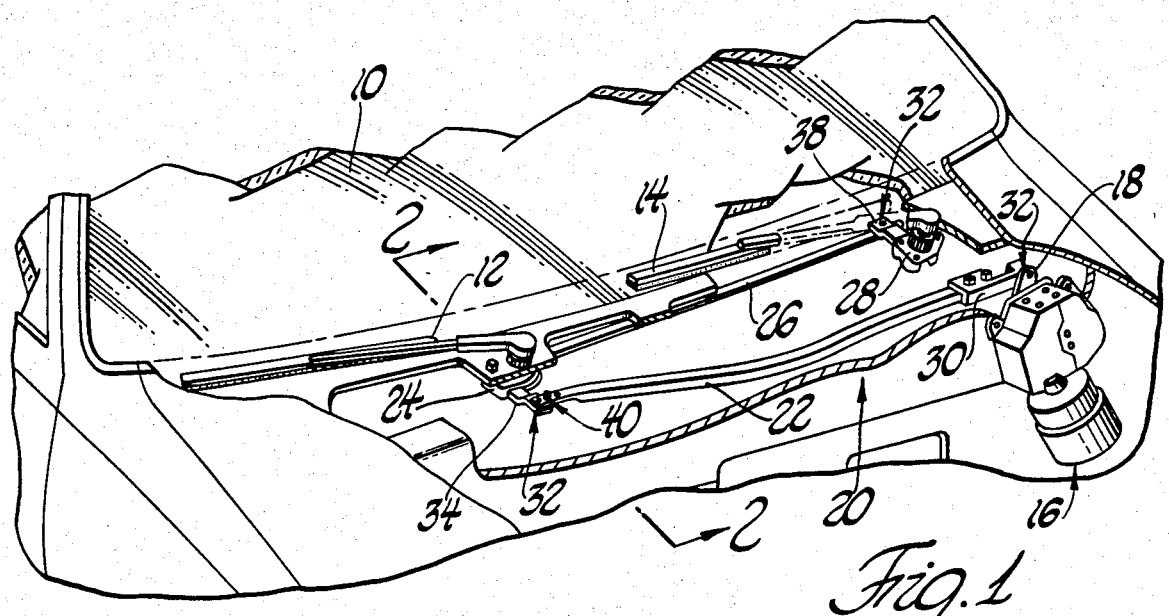
Fig. 1
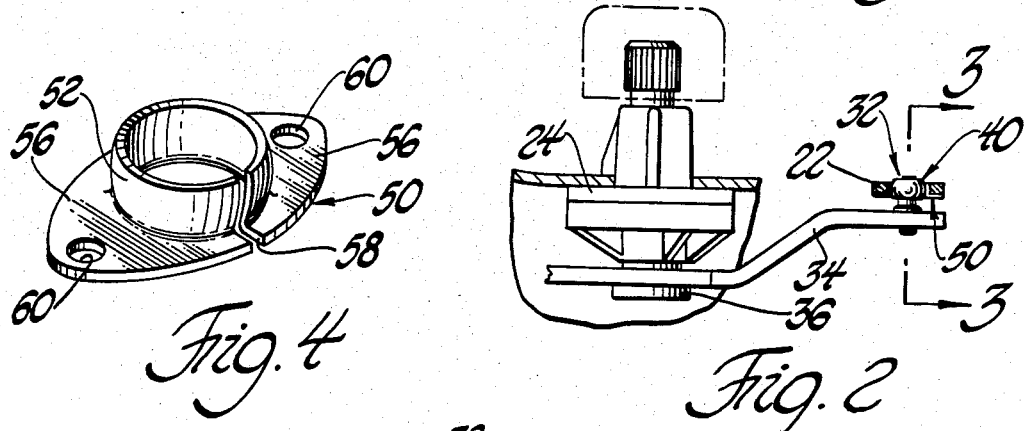
Fig. 4
Fig. 2
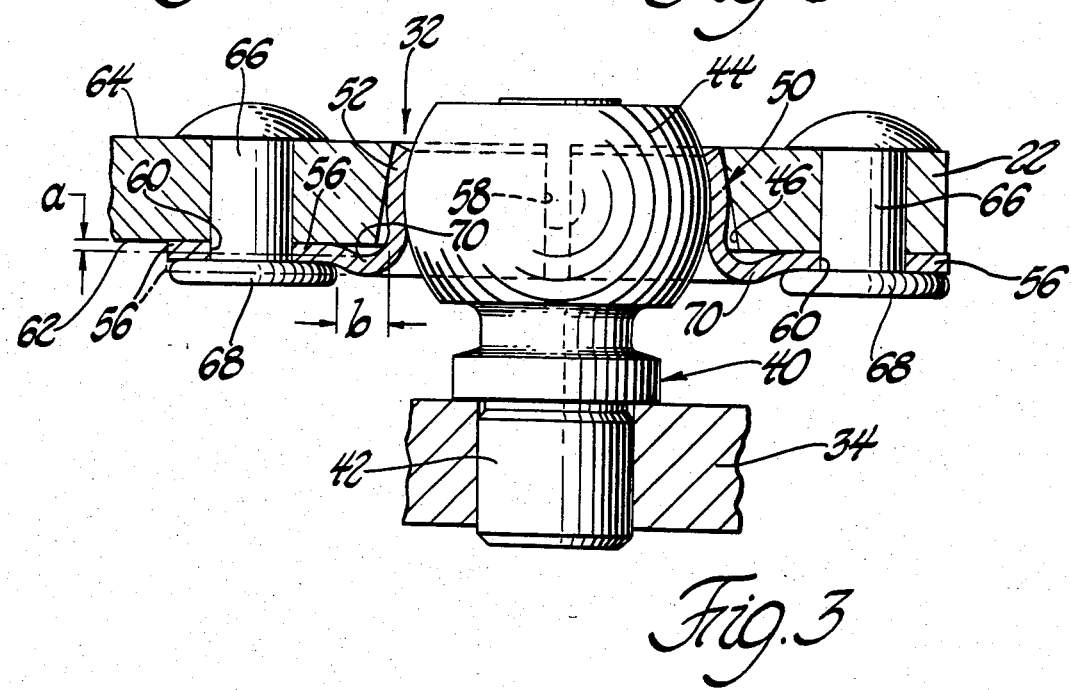
Fig. 3

WINDSHIELD WIPER BALL JOINT

This invention relates to automotive windshield wiper transmission linkage and like apparatus and more particularly to a universal ball joint connection for linkage members of such apparatus.

The invention is addressed most specifically to the well known problems associated with provision of universal ball joint connections in such windshield wiper and like apparatus characterized by rugged use conditions which generally lead inevitably to some amount of wear in the joints after prolonged service life. As has been noted in Zeigler U.S. Pat. No. 3,299,721 and Ashworth et al U.S. Pat. No. 2,767,004, to the degree such wear occurs in the joint parts, it is desirable to automatically take up such wear to maintain a precise or tight connecting joint.

The primary feature of this invention is that in accomplishing the noted objective of automatic wear take up, there is provided an exceedingly economical construction employing simply a stamped sheet metal or otherwise economically formed socket member including a socket portion engaged over the usual ball stud of one linkage member and together therewith received in a tapered hole in the mated linkage member. The socket member is slotted and includes integral attachment portions operative to provide self-bias of the socket member axially within the hole taper to induce squeezing of the socket portion automatically taking up ball joint wear to the degree such wear may occur.

This principle feature and other features and advantages of the invention will be readily apparent from the following specification and from the drawings wherein:

FIG. 1 is a fragmentary partially brokenaway perspective view of an automotive vehicle windshield wiper mechanism including a transmission linkage ball joint according to this invention;

FIG. 2 is an enlarged view of a portion of FIG. 1 taken generally along the plane indicated therein by the lines 2—2;

FIG. 3 is a further enlarged view of a portion of FIG. 2 taken generally along the plane therein indicated by lines 3—3;

FIG. 4 is an enlarged perspective view.

Referring now particularly to FIG. 1 of the drawing, the same illustrates an automobile body including a windshield 10 and windshield wiper apparatus therefor including a widely spaced pair of wiper blades 12 and 14 adapted to oscillate in well-known manner over the windshield between a parked position, as shown, and some selected pattern limit position displaced clockwise from the parked position. The continuous cyclic or oscillatory coordinated motion of the wiper blades is conventionally accomplished by suitable transmission linkage driven by an electric motor drive unit, indicated generally at 16, which typically includes a d.c. motor and speed reduction gear designed to provide low speed high torque continuous uni-directional rotation of an output crank arm member, shown at 18. It is of course usually desired that drive unit 16 be mounted to provide complete freedom of design both as to it and as to the transmission linkage, but crowding of the engine compartment places limits on that freedom and accordingly the unit 16 may have to be mounted in positions such as shown in FIG. 1, and certain parts of the linkage must accommodate substantial displacement in diverse planes.

The wiper transmission is designated generally as 20 and may include in the particular style of wiper mechanism shown herein a first link assembly 22 oriented generally transversely of the vehicle below windshield 10, a wiper shaft and housing assembly 24 for wiper blade 12, a second transversely oriented operating link 26, and finally a second shaft and housing assembly 28 for wiper blade 14.

Link 22 includes an adjuster member 30 adjustably affixed to the end of a main link element and having in turn at its end a ball stud coupling 32 operatively connecting crank 18 with the link 22, and another such coupling connecting the latter to assembly 24. Continuous rotation of the crank in one direction will impart to the link cyclic or back and forth motion transverse to the vehicle body as well as swinging motion in generally transverse planes thereof about its coupling to assembly 24.

As seen best in FIG. 2, wiper shaft and housing assembly 24 conventionally includes a connecting arm 34 having affixed intermediate its ends thereof for rotation therewith the lower end of a drive shaft 36 journalled within the housing 24. Oscillation imparted to the connecting arm by link 22 will provide the required oscillatory wiping pattern of wiper blade 12 over the windshield as well as transfer of coordinated similar such oscillation to wiper blade 14 via the second transmission link 26. Thus, shaft and housing assembly 28 includes in a form similar to assembly 24 just described another arm 38 affixed to a drive shaft in the housing assembly carrying such arm 14. The two wiper shafts may be generally parallel, but minor misalignments between them may occur in vehicle assembly or field service adjustments. Thus, a further pair of ball stud couplings 32 operatively connect the adjacent ends of links 22 and 26 with connecting arm 34. Another such ball stud coupling 32 operatively connects the remote end of link 26 with the arm 38 of shaft and housing assembly 28. Accordingly, the various couplings 32 being constructed of ball stud and socket type, relative rotation between the various connecting parts may occur in more than one plane during operation of the wiper mechanism as set forth. It is also preferred that the link members 22 and 26 be economically fabricated of stamped sheet metal having terminal end portions such as indicated in FIG. 2 featuring a single flat stock thickness presenting minimum space consumption in the areas of coupling.

Referring to FIG. 3, representative of the various ball stud couplings, there is provided in accordance with the invention a ball stud 40 having a shank 42 thereof secured within an aperture of link connecting arm 34 in conventional manner, and extended by a part spherical coupling portion 44. First link member 22 is apertured as at 46 to receive coupling portion 44 as well as the ball socket portion of a socket member 50.

Referring to FIG. 4, socket member 50 is preferably of a stamped sheet metal configuration. It may be fabricated of commercially available material specifically adapted to bearing applications and characterized by a base constituent of spring tempered steel provided with a bonded Teflon coating or similar anti-friction material on surfaces of its socket portion. Such socket portion is designated as 52 and is integrally stamped or otherwise formed with substantially flat attachment flanges 56 separated by a slot 58. Each flange 56 is apertured as at 60 for purposes of riveting as will appear.

Reverting to FIG. 3, the tapered aperture 46 in link 42 is sized with a greatest diameter at or adjacent the under surface 62 of the link 22 and sufficiently larger than the largest or great circle diameter defined by the socket portion 52, when engaged over ball stud coupling portion 44, that such engaged parts may readily be inserted in the aperture such as to the position shown. Conversely, such great circle diameter of the socket portion 52 when so inserted is predeterminedly larger than the minor or least diameter of the link aperture 46 at or adjacent the upper surface 64 of the link member. More specifically, with the ball coupling portion 44 and socket portion 52 installed within such aperture 46 with an axial thrust against the wall of the latter sufficient to wedgingly squeeze the slotted socket portion 52 against coupling portion 44 with a requisite radial force characteristic, or tightness, desired in the joint, nevertheless the least diameter of aperture 46 is still exceeded by such socket great circle diameter by a planned margin. Such margin determines an ultimate desired spacing, indicated at "a", between the flat flanges when not yet riveted (represented in broken lines), and the undersurface 62 of link 22. It is noted that in such condition slot 58 is far from squeezed closed.

Rivets 66 placed in flange aperture 60 are then headed tightly at 68 over flanges 56 to stress the large areas of the same flushly against link 22. Thus, resiliently deformed portions 70 of the socket member are created around the juncture of the socket portion with such flanges, which partake of the resilience of the spring steel or like material of the socket member to provide constant bias within the body of such member urging socket portion 52 axially upwardly within the aperture 46.

Thus, as any wear of material may occur in the socket and ball interfaces in link 22, the socket portion is biased upwardly against the gradually narrowing wall of aperture 46 and squeezed further firmly over coupling portion 44, to preserve the desired tightness in the ball joint. Other than pure conical taper in aperture 46 may be found desirable, all within the spirit of the invention. The spacing "b" (FIG. 3) of rivet heads 68 from aperture 46 and the number thereof, along with the material thickness of socket member 50 and properties thereof, may determine the extent and effectiveness of resiliently deformed portions 70.

The embodiments of the invention in which an exclusive property or privilege is claimed are defined as follows:

1. A universal joint for linkage apparatus including a pair of link members, comprising, means defining in one of said members a hole smoothly varying in diameter from a largest diameter adjacent one surface of such one member diameter to a least diameter adjacent the opposite surface thereof, a ball stud on the other of said members received in said hole, a socket member including a part-spherical socket portion engaged in said hole over said ball stud and slotted so as to be squeezable to decreasing diameters upon movement thereof in a direction axially of said hole toward said opposite surface, said socket member further including integral resilient attachment portions adapted for juxtaposition to said one surface, and attachment means resiliently stressing said attachment portions in secured and deformed relation to said one member about their juncture with said socket portion in a manner whereby said socket portion is urged axially of said hole toward said opposite surface.

2. A universal joint for linkage apparatus including a pair of link members, comprising, means defining in one of said members a generally tapered hole having adjacent one surface of such one member a greater diameter and adjacent the opposite surface thereof a least diameter, a ball stud on the other of said members received in said hole, a socket member of resilient material having formed therein a slotted socket portion received in said hole over said ball stud and which in a normal unstressed condition has a greatest diameter intermediate said greater and least diameters of said tapered hole, said socket member further including integral attachment flange portions adapted for juxtaposition to said one surface and which while in a normal unstressed condition upon reception of said socket portion in said hole over said ball stud are spaced from such one surface, and attachment means resiliently stressing said flange portions in secured and deformed relation to said one member about their juncture with said socket portion upon wear between said ball stud and said socket portion the latter is urged by said flange portions axially of said hole so as to be squeezed to decreasing diameters to take up such wear.

* * * * *